(12) United States Patent
Davis et al.

(10) Patent No.: US 9,098,507 B2
(45) Date of Patent: Aug. 4, 2015

(54) DYNAMIC CONTENT PRESENTATION

(75) Inventors: Bryan Davis, San Antonio, TX (US); Dan Musgrove, Millstone, NJ (US); Michael Raftelis, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 507 days.

(21) Appl. No.: 12/630,159

(22) Filed: Dec. 3, 2009

(65) Prior Publication Data

US 2011/0137948 A1   Jun. 9, 2011

(51) Int. Cl.
*G06F 17/30* (2006.01)

(52) U.S. Cl.
CPC ...... *G06F 17/3002* (2013.01); *G06F 17/30056* (2013.01)

(58) Field of Classification Search
CPC .................................................. G06F 17/30896
See application file for complete search history.

(56) References Cited

U.S. PATENT DOCUMENTS

| | | | |
|---|---|---|---|
| 6,519,617 B1 | 2/2003 | Wanderski et al. | |
| 6,658,625 B1 | 12/2003 | Allen | |
| 6,763,499 B1 * | 7/2004 | Friedman et al. | 715/240 |
| 2003/0018607 A1 * | 1/2003 | Lennon et al. | 707/1 |
| 2003/0078934 A1 * | 4/2003 | Cappellucci et al. | 707/101 |
| 2005/0038796 A1 * | 2/2005 | Carlson et al. | 707/100 |
| 2007/0067458 A1 * | 3/2007 | Chand | 709/226 |
| 2007/0088837 A1 * | 4/2007 | Gidron et al. | 709/228 |
| 2007/0288478 A1 * | 12/2007 | DiMaria et al. | 707/10 |
| 2008/0021861 A1 * | 1/2008 | Fitzsimons et al. | 707/1 |
| 2008/0109464 A1 * | 5/2008 | Ozzie et al. | 707/101 |
| 2008/0313130 A1 * | 12/2008 | Hammond et al. | 707/2 |
| 2009/0043738 A1 * | 2/2009 | James et al. | 707/3 |
| 2009/0063649 A1 * | 3/2009 | Yamagishi | 709/207 |
| 2009/0083314 A1 * | 3/2009 | Maim | 707/103 R |
| 2009/0138441 A1 * | 5/2009 | Valentine et al. | 707/3 |
| 2009/0171993 A1 * | 7/2009 | Arthursson | 707/100 |
| 2010/0070448 A1 * | 3/2010 | Omoigui | 706/47 |
| 2010/0083124 A1 * | 4/2010 | Druzgalski et al. | 715/738 |
| 2010/0094728 A1 * | 4/2010 | Denning et al. | 705/27 |
| 2010/0106721 A1 * | 4/2010 | Mori | 707/736 |
| 2011/0096174 A1 * | 4/2011 | King et al. | 348/207.1 |
| 2011/0113011 A1 * | 5/2011 | Prorock et al. | 707/634 |

* cited by examiner

*Primary Examiner* — Mohammad S Rostami
(74) *Attorney, Agent, or Firm* — Toler Law Group, PC (57) ABSTRACT

A computer-implemented method includes receiving, at a computing device, a request from a user device to access requested data. Based on the request, a reader object is selected that specifies data access information associated with accessing data from a particular data source. Computer-implementable access code is dynamically instantiated to access the requested data from a data source based on the reader object and the request. A data access request is sent to the data source based on the computer-implementable access code. The requested data is received from the data source and a presentation object is selected that specifies data output information associated with the reader object. Computer-implementable output code is dynamically instantiated to output the requested data based on the presentation object. Output data, including the requested data, is sent to the user device in a presentation format specified by the computer-implementable output code.

20 Claims, 7 Drawing Sheets

DYNAMIC CONTENT PRESENTATION

FIELD OF THE DISCLOSURE

The present disclosure is generally related to dynamic content presentation.

BACKGROUND

Extensible Markup Language (XML) is a textual data format designed for simplicity, generality, and usability over the Internet. While XML is a standard, many different forms of XML have been developed, including Really Simple Syndication (RSS), Extensible Hypertext Markup Language (XHTML), Simple Object Access Protocol (SOAP), among others. The many different forms of XML (e.g., RSS, XHTML, SOAP) may make it difficult for enterprises to use XML data in a way that is easily deployed in various applications (e.g., Internet Protocol Television (IPTV) applications, mobile applications, web applications, or internal intranet applications). Developing and maintaining individual solutions for each form of XML for various applications would increase complexity and cost for the development. As a result, it may be difficult to quickly develop applications using this widespread standardized form of data.

DETAILED DESCRIPTION

The present disclosure describes the use of published standards XML to ingest content from multiple sources. The published standards XML is used as a lowest common denominator in order to utilize data in various XML formats in multiple applications. For example, particular embodiments of the present disclosure may be used with basic XML web services, basic XML feeds, XML flat files, and SOAP XML web services, among other alternatives. An administrator may utilize a user interface of the present disclosure to configure a single data retrieval operation for a particular XML data feed regardless of the type of XML data feed. The data that is retrieved from the XML data feed is in a format (e.g., published standards XML) that may be utilized by various applications without the need to develop customized systems for multiple types of applications. As a result, particular embodiments of the present disclosure may allow for a reduction of time to market of applications utilizing third-party content and may allow standardization of personnel training procedures.

In a particular embodiment, a computer-implemented method of dynamic content presentation is disclosed. The method includes receiving, at a computing device, a first request from a first user device to access requested data. Based on the first request, a first reader object is selected from a database of reader objects. Each of the reader objects specifies data access information associated with accessing data from a particular data source. The method includes dynamically instantiating computer-implementable access code to access the requested data from a first data source based on the first reader object and the first request. Based on the computer-implementable access code, a data access request is sent to the first data source. The requested data is received from the first data source and a first presentation object is selected from a database of presentation objects. Each of the presentation objects specifies data output information associated with one or more of the reader objects. The method also includes dynamically instantiating computer-implementable output code to output the requested data based on the first presentation object. Output data, including the requested data, is sent to the first user device in a presentation format specified by the computer-implementable output code.

In another particular embodiment, a system is disclosed that includes a reader object selector, an access code instantiator, a presentation object selector, and an output code instantiator. The reader object selector is configured to receive a first request from a first user device to access requested data and to select, from a database of reader objects, a first reader object based on the first request. Each of the reader objects specifies data access information associated with accessing data from a particular data source. The access code instantiator is configured to dynamically instantiate computer-implementable access code to access the requested data from a first data source based on the first reader object and the first request. The access code instantiator is further configured to send a data access request to the first data source based on the computer-implementable access code. The presentation object selector is configured to receive the requested data from the first data source and to select a first presentation object from a database of presentation objects. Each of the presentation objects specifies data output information associated with one or more of the reader objects. The output code instantiator is configured to dynamically instantiate computer-implementable output code to output the requested data based on the first presentation object. The output code instantiator is further configured to send output data including the requested data in a presentation format specified by the computer-implementable output code to the first user device.

Figure 1:
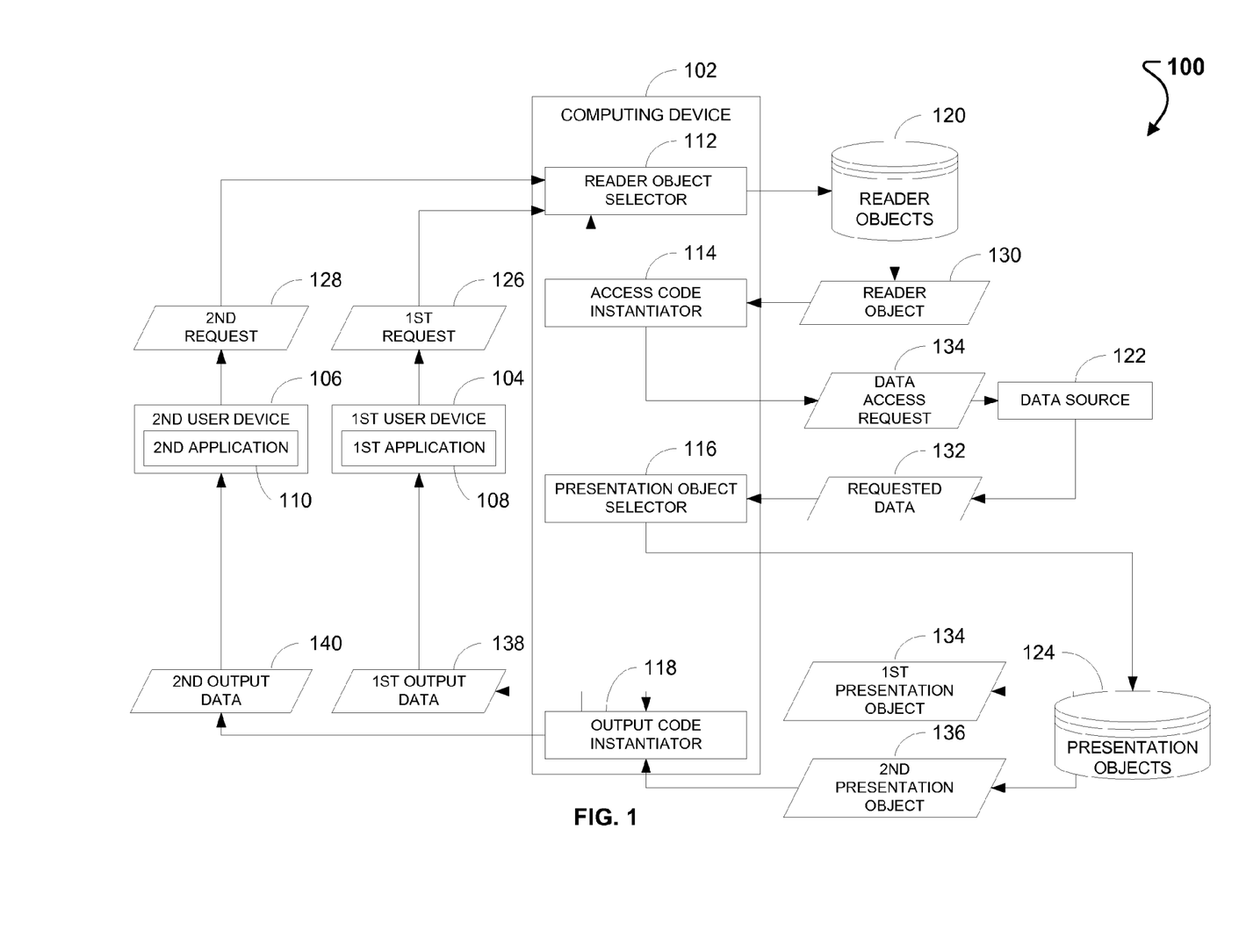
FIG. 1 is a block diagram of a first illustrative embodiment of a dynamic content presentation system.

Referring to FIG. 1, a first illustrative embodiment of a dynamic content presentation system is illustrated, at 100. The system 100 includes a computing device 102 in communication with a first user device 104 and a second user device 106. A first application 108 is executable by the first user device 104, and a second application 110 is executable by the second user device 106. In one embodiment, the first user device 104 is a set-top box device, the first application 108 is a set-top box application, and the second user device 106 is a mobile device (e.g., a mobile telephone), and the second application 110 is a mobile device application. The computing device 102 includes a reader object selector 112, an access code instantiator 114, a presentation object selector 116, and an output code instantiator 118. The computing device 102 is in communication with a database of reader objects 120, a data source 122, and a database of presentation objects 124. In one embodiment, the computing device 102 is connected to the data source 122 via a network (e.g., the Internet).

In the system 100 of FIG. 1, configuration information may be used to dynamically generate code to read and process XML data available at the data source 122 and to generate an output based on the XML data in response to a user request. The output may be in a first format for presentation to different applications executable at different types of devices. The XML data retrieved from the data source 122 may be presented in a first format for a first type of application and may be presented in a second format for a second type of application. For example, in the embodiment illustrated in FIG. 1, the XML data retrieved from the data source 122 may be presented to the first user device 104 in a first format (e.g., in a format associated with a television screen size) associated with the first application 108 (e.g., a set-top box application), and the XML data may be presented to the second user device 106 in a second format (e.g., in a format associated with a mobile device screen size) associated with the second application 110 (e.g., a mobile device application). By dynamically generating reading and processing code in response to a user request, the time consuming process of manual code writing of individual XML parsers for each type of application may be avoided.

The reader object selector 112 of the computing device 102 is configured to receive a first request 126 from the first user device 104 and to receive a second request 128 from the second user device 106. The reader object selector 112 is further configured to select a reader object 130 from the database of reader objects 120 based on a received request. Each of the reader objects included in the database of reader objects 120 specifies data access information associated with accessing information from a particular data source. For example, in the embodiment illustrated in FIG. 1, the reader object 130 specifies data access information associated with accessing information from the data source 122. To illustrate, the first application 108 (e.g., a set-top box application) and the second application 110 (e.g., a mobile device application) may utilize data from the data source 122. For example, the data source 122 may include an XML feed of top news stories, and both the set-top box application and the mobile device application may display at least a portion of the top news stories.

The access code instantiator 114 is configured to dynamically instantiate computer-implementable access code to access requested data 132 from the data source 122 based on the reader object 130 that is selected based on the received request (e.g., the first request 126 or the second request 128). Thus, the computer-implementable access code is dynamic and is not instantiated until a request for data is received (e.g., when the first request 126 or the second request 128 is received). The reader object 130 may include information about how to connect to the data source 122 and information about how to retrieve particular XML data from the data source 122. Based on this information, the access code instantiator 114 dynamically instantiates computer-implementable access code to generate a data access request 134 that is sent to the data source 122. For example, in the case of an XML feed of top news stories from a news website, the access code instantiator 114 dynamically instantiates computer-implementable access code to access the top news stories from the news website. In this case, the reader object 130 includes information about how to connect to the news website and includes information about how to retrieve the XML feed of top news stories from the news website. The access code instantiator 114 dynamically generates a data access request 134 that is sent to the news website requesting the top news stories.

In a particular embodiment, the access code instantiator 114 may communicate with the reader object selector 112 to indicate that a second reader object selector (not shown) is to be selected from the database of reader objects 120. For example, the second reader object may specify data access information associated with a second data source (not shown) that is different from the first data source 122. For example, the second reader object may be selected in response to detecting an event related to the requested data 132. As an example, the requested data 132 may have particular characteristics or content (e.g., a reference to the second data source), and the second reader object may be used to access data from the second data source. In this case, the access code instantiator 114 may dynamically instantiate second access code to retrieve data from the second data source based on the second reader object associated with the second data source.

The presentation object selector 116 is configured to receive the requested data 132 from the data source 122 and to select a presentation object from the database of presentation objects 124. Each of the presentation objects in the database of presentation objects 124 specifies data output information associated with one or more types of devices or one or more types of applications. For example, a presentation object associated with a particular type of application (e.g., a set-top box application) may specify a particular format for presenting data within the particular type of application. As another example, a presentation object associated with a particular type of device (e.g., a mobile device) may specify a particular format for presenting data at the particular type of device. Each presentation object in the database of presentation objects 124 is associated with at least one type of device or at least one type of application.

In the embodiment illustrated in FIG. 1, a first presentation object 134 and a second presentation object 136 are associated with the reader object 130. The presentation object selector 116 may select the first presentation object 134 for the first request 126 and may select the second presentation object 136 for the second request 128. The first presentation object 134 may be associated with a device type of the first user device 104 or an application type of the first application 108. Similarly, the second presentation object 136 may be associated with a device type of the second user device 106 or an application type of the second application 110. As an example, the device type of the first user device 104 may be a set-top box device type, and the first presentation object 134 may be associated with at least the set-top box device type. In this case, because the first request 126 is received from a set-top box device type, the first presentation object 134 is selected. The first presentation object 134 may also be associated with a set-top box application type. In this case, because the first request 126 is received from a set-top box application type, the first presentation object 134 is selected. As another example, the device type of the second user device 106 may be a mobile device type, and the second presentation object 136 may be associated with at least the mobile device type. In this case, because the second request 128 is received from a mobile device type, the second presentation object 136 is selected. The second presentation object 136 may also be associated with a mobile application type. In this case, because the second request 128 is received from a mobile application type, the second presentation object 136 is selected.

The output code instantiator 118 is configured to dynamically instantiate computer-implementable output code to output the requested data 132 based on the selected presentation object (e.g., the first presentation object 134 or the second presentation object 136). Thus, the computer-implementable output code is dynamic and is not instantiated until a selected presentation object is received (e.g., when the first presentation object 134 or the second presentation object 136 is received). The output code instantiator 118 is further configured to send output data including the requested data 132 in a presentation format specified by the computer-implementable output code to the requesting user device (e.g., the first user device 104 or the second user device 106). For example, in the case of the first user device 104, the output code instantiator 118 sends first output data 138 to the first user device 104 in a format specified by the first presentation object 134. As another example, in the case of the second user device 106, the output code instantiator 118 sends second output data 140 to the second user device 106 in a format specified by the second presentation object 136. In one embodiment, one or more display objects that are not included in the requested data 132 retrieved from the data source 122 are included in the first output data 138 or the second output data 140. For example, a display element (e.g., an up arrow or a down arrow associated with market performance of a stock) or a button may be included in the first output data 138 or the second output data 140 as a result of an XSLT transformation.

In operation, the computing device 102 receives the first request 126 from the first user device 104 or receives the second request 128 from the second user device 106. The first request 126 may be received before the second request 128, the first request 126 may be received after the second request 128, or the first request 126 and the second request 128 may be received substantially simultaneously. In one embodiment, the first user device 104 includes a set-top box device that includes a set-top box device application (e.g., the first application 108), and the first request 126 may be sent via a wired network (e.g., an Internet Protocol Television (IPTV) network) to the computing device 102 associated with the wired network (e.g., an IPTV server). In another embodiment, the second user device 104 may include a mobile device (e.g., a mobile telephone) and the second request 128 may be sent to the computing device 102 via a wireless network (e.g., a wireless telephone network).

The request from the user device (e.g., either the first request 126 from the first user device 104 or the second request 128 from the second user device 106) includes information associated with the data source 122 (e.g., a Uniform Resource Locator (URL), IP address, etc.) and may include additional information. For example, the first request 126 may include information associated with the first user device 104, and the second request 128 may include information associated with the second user device 106. As an example, the information associated with the user device may include a type of user device (e.g., a set-top box device type), previous requests by the user device (e.g., historical information), or user preference information with respect to presentation of the requested data 132. As another example, the request from the user device may include dynamic information such as a time of day, weather conditions, a date (e.g., weekday, weekend, holiday), among other alternatives. Thus, the request from the user device may include multiple types of static and dynamic data that may be used by the reader object selector 112 to select the reader object 130.

The reader object selector 112 may include an XML reader application (XRA) that selects an XRA object that is used to instantiate code that is particular to the information that a user requested. In one embodiment, the XRA object includes a generic set of rules that are used to instantiate code in real time based on the information included in a request from a user device (e.g., the first request 126 from the first user device 104). To illustrate, the first request 126 may include a request for top news stories from a particular news website. The particular news website may be associated with an XRA object that includes a generic set of rules to apply to XML code retrieved from the particular news website. In this case, the reader object selector 112 (e.g., an XRA object selector) may select the reader object 130 that is associated with the particular news website from the database of reader objects 120. Based on the selected reader object 130, the access code instantiator 114 dynamically generates the data access request 134 to retrieve the requested data 132 from the data source 122.

Figure 3:
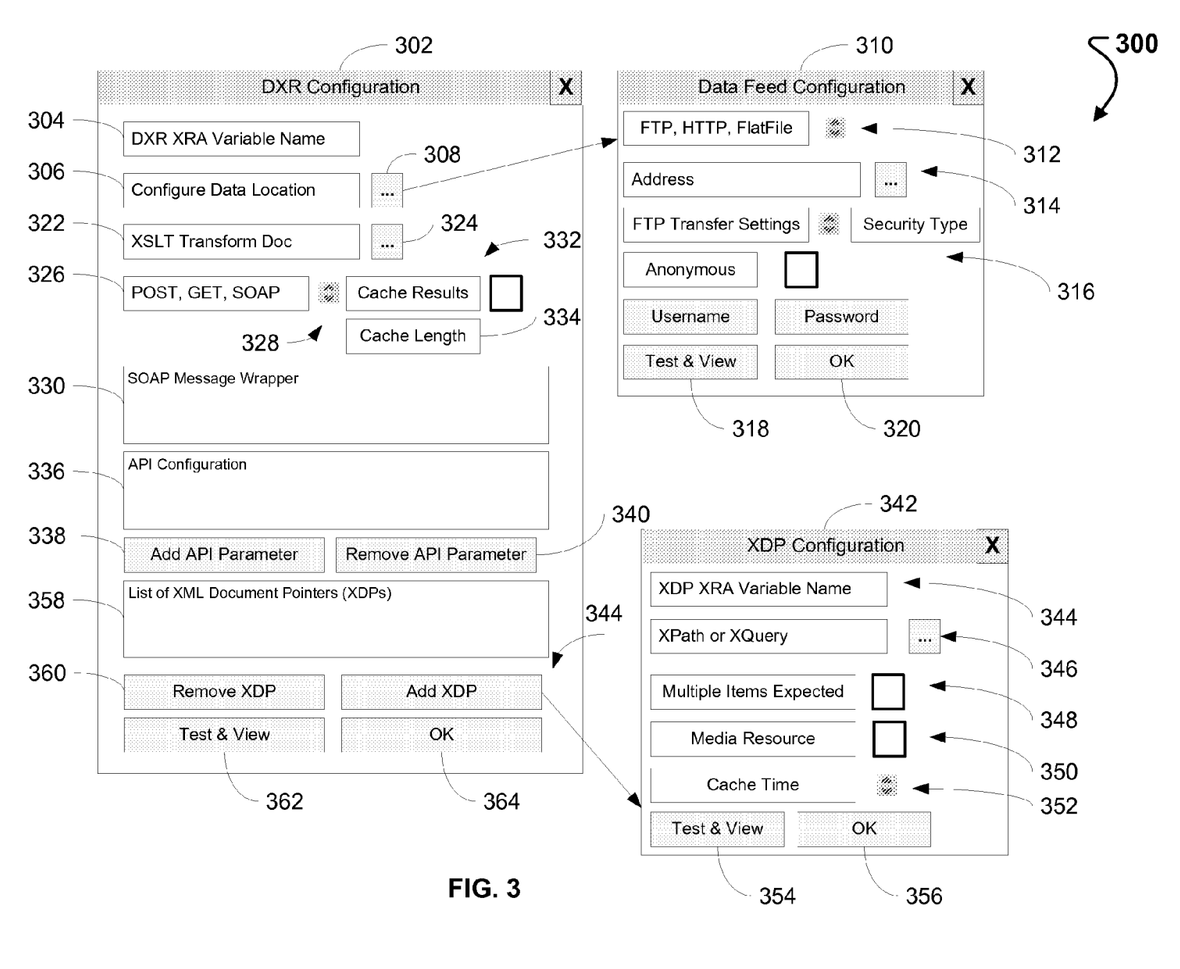
FIG. 3 is a general diagram of an illustrative embodiment of a first user interface associated with configuration of a dynamic content presentation system.

In an illustrative embodiment, the first user device 104 includes a set-top box device, the data source 122 includes a news website, and the requested data 132 includes a request for top news stories from the news website. In this case, the access code instantiator 114 dynamically generates access code to retrieve the top news stories from the news website based on dynamic XML reader (DXR) location details associated with the news website. FIG. 3 below illustrates configuration of the DXR location details associated with a particular data source. The DXR location details specify how to retrieve the requested data 132 from the data source 122. For example, the requested data 132 may be retrieved from a file transfer protocol (FTP) data feed, a Hypertext Transfer Protocol (HTTP) data feed, or a flat file data feed, among other alternatives. The DXR location details include information associated with retrieving data based on the particular type of data feed.

In response to the data access request 134, the requested data 132 is received at the presentation object selector 116 from the data source 122. In one embodiment, a generic object is applied to the requested data 132. The generic object may be associated with a first level of normalization, such as an extensible style sheet language transformation (e.g., an XSLT transformation). For example, in an application that includes stock market information, different stocks may include up or down arrows depending on market performance. An XSLT transformation may be used to identify an appropriate image to display (e.g., an up arrow or a down arrow). As another example, the XSLT transformation may be used to strip HTML tags, filter one or more words (e.g., profanity), reformat text, or replace text, among other alternatives. As a further example, the XSLT transformation may be used to truncate, filter, verify, or sort the requested data 132. Thus, the XSLT transformation allows an administrator to transform the requested data 132 or to append additional data to the requested data 132 prior to the output code instantiator 118 generating output data in a particular format for presentation to the user device.

The presentation object selector 116 may include an XML data pointer (XDP) that may be used to assemble the requested data 132 received from the data source 122. For example, the XDP may retrieve a title of a particular news story, filter the title for profanity, retrieve a globally unique identifier (GUID) and determine if the GUID is in fact unique, retrieve the description of the particular news story and shorten the text of the news story to a predetermined number of characters, retrieve an image URL and ensure that the image exists, among other alternatives.

In one embodiment, once one or more XDPs are processed, the data gathered by the XDPs is mapped into output fields based on the specific application (e.g., the first application 108 or the second application 110) that the user is running. For example, the gathered data may be arranged in a first arrangement for a news reader application, a second arrangement for a television application, and a third arrangement for a mobile device application. In a particular embodiment, the application may include an interactive application. For example, the interactive application may include a movie application, and menu buttons corresponding to different movie titles may be displayed. As another example, for a video-on-demand (VOD) application, some videos may have previews while others may not. For those VOD videos that include previews, a menu button may be included that provides an option to play the preview.

Thus, the system of FIG. 1 may allow an administrator to configure a single reader object (e.g., the reader object 130) for a particular type of XML data feed (e.g., the XML data feed from the data source 122). The reader object 130 may be re-used by multiple types of applications and multiple types of devices to retrieve XML data from the data source 122 without configuring separate XML data readers for each type of application or each type of device. Upon retrieval, the requested data 132 may be formatted for a particular type of device or for a particular type of application prior to presentation.

Figure 2:
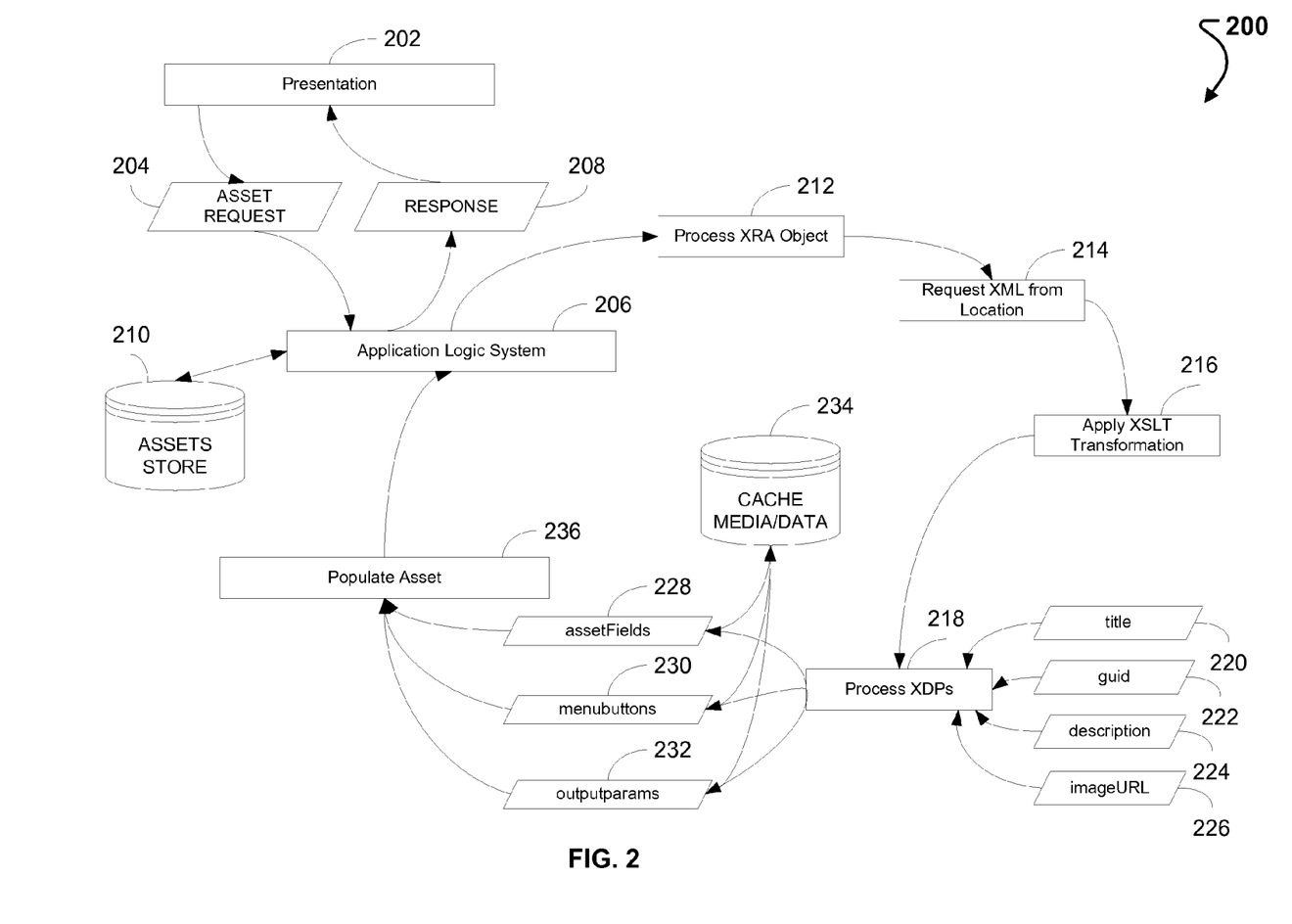
FIG. 2 is a block diagram of a second illustrative embodiment of a dynamic content presentation system.

Referring to FIG. 2, a second particular illustrative embodiment of a dynamic content presentation system is illustrated, at 200. FIG. 2 illustrates a particular embodiment of dynamic content presentation. At 202, information is presented to a user device. For example, the information may include the first output data 138 or the second output data 140 of FIG. 1, and the user device may include the first user device 104 or the second user device 106 of FIG. 1. In order for the information to be presented to the user device, an asset request 204 is sent to an application logic system 206 that provides a response 208 based on the asset request 204. For example, the application logic system 206 may be the computing device 102 of FIG. 1, the asset request 204 may be the first request 126 or the second request 128 of FIG. 1, and the response 208 may be the first output data 138 or the second output data 140 of FIG. 1.

As an example, the application logic system 206 may include an IPTV server, and the user device may include a set-top box device that is running a set-top box application that sends the asset request 204 to the IPTV server. For example, a user may be running a set-top box application related to movies, and the asset request 204 may include a request for information about a particular movie. As another example, the application logic system 206 may include a mobile device server, and the user device may include a mobile device that is running a mobile device application that sends the asset request 204 to the mobile device server. For example, a user may be running a mobile device application related to top news stories, and the asset request 204 may include a request for top news stories from a news website.

The application logic system 206 is in communication with an assets store 210. The application logic system 206 processes an XRA object that is used to instantiate code that is particular to the information that a user requested (e.g., information associated with the asset request 204). Thus, the application logic system 206 determines information related to how an administrator (e.g., an application developer) desired the particular application or device to present the asset, at 202. If the XRA object indicates that the administrator permits or elects retrieval of external data (e.g., XML data from a particular XML feed), then the XRA object is processed, at 212. Processing the XRA object may include one or more XML data retrievals from one or more XML feeds. The XRA object includes details provided by the administrator with respect to data retrieval from the one or more XML data feeds. For example, the XRA object may include the reader object 130 of FIG. 1, and the assets store 210 may include the database of reader objects 120 of FIG. 1.

Processing the XRA object includes dynamically instantiating access code. Based on the dynamically instantiated access code, XML is requested from one or more locations, at 214. For example, the access code instantiator 114 of FIG. 1 may process the reader object 130, resulting in dynamically instantiated access code to send the data access request 134 to the data source 122 of FIG. 1. In one embodiment, the XRA object includes multiple XML data retrievals from multiple sources (e.g., data sources other than the data source 122 of FIG. 1).

At 216, a first level of normalization (e.g., an XSLT transformation) is applied. For example, the XSLT transformation may include parsing data retrieved from a location, processing the data using one or more rules, determining a particular image format associated with an image retrieved from the location, and applying rules associated with a particular user request. In the case of a news website, a rule may include retrieving identifiers associated with top news stories and requesting a next RSS feed based on the identifiers. In one embodiment, the XSLT transformation is applied to the requested data 132 received from the data source 122 of FIG. 1.

At 218, one or more XDPs are processed. Processing the XDPs includes assembling data after the first level of normalization (e.g., the XSLT transformation). Basic processing may include determining a title 220, determining a global unique identifier (GUID), determining a description 222, and determining an imageURL 226. An example of advanced processing may include filtering the title 220 and the description 224 for profanity and determining whether the imageURL 226 actually exists or is associated with offensive images. In one embodiment, when the imageURL 226 does not exist, the imageURL 226 is disabled. Another example of advanced processing may include determining that the GUID 222 is in fact unique, shortening the description 224 to a predetermined number of characters (e.g., for display via a mobile application on a mobile telephone) and adding ellipses to indicate shortening.

Once the XDPs are processed, data gathered by the XDPs is mapped into output fields based on the specific application that the user is running. Based on the application, one or more asset fields 228, one or more menu buttons 230, or one or more output parameters 232, or any combination thereof may be selected. For example, for a set-top box application related to movies, each of the menu buttons 230 may be associated with movie titles that are returned by the XDPs. As another example, the output parameters 232 may include additional information that is to be presented in a subsequent page based on the GUID 222. For example, for a particular movie title associated with the GUID 222, the output parameters 232 may indicate that a movie preview may be displayed in response to selection of the menu button 230 associated with the movie title. In the embodiment illustrated, the asset fields 228, the menu buttons 230, and the output parameters 232 may be retrieved from a cache 234 of media and data. For example, a user may have recently requested the same information that is requested by a subsequent user, and the information may have been stored at the cache 234 in order to avoid a second instantiation of access code to retrieve the information.

At 236, the asset is populated. For example, in one application, a particular screen may be displayed including one arrangement of information while in another application a different screen may be displayed. To illustrate, a news reader application may be arranged one way while a television application or a phone application may be arranged another way. In one embodiment, the presentation object selector 116 of FIG.

1 selects the first presentation object 134 from the database of presentation objects 124 for the first application 108 at the first user device 104.

The response 208 provided by the application logic system 206 is in a particular presentation format associated with the application. In one embodiment, the output code instantiator 118 of FIG. 1 may be used to dynamically instantiate output code to present the first output data 138 to the first user device 104 in a particular format based on the first presentation object 134.

Thus, the application logic system 206 of FIG. 2 may dynamically instantiate computer-implementable access code (i.e., by processing the XRA object, at 212) to request data from a particular location associated with the XRA object, in response to the asset request 204. Upon retrieval, the requested data may be formatted for a particular type of device or for a particular type of application prior to presentation, at 202. A first level of normalization may be applied (e.g., the XSLT transformation, at 216) regardless of the type of application or device that makes the asset request 204. The application logic system 206 of FIG. 2 may dynamically instantiate computer-implementable output code to present the normalized data in a customized format that is based on the particular application or device that makes the asset request 204.

Referring to FIG. 3, a general diagram of an illustrative embodiment of a first user interface associated with configuration of a dynamic content presentation system is illustrated, at 300. The first user interface may be used by an administrator to configure a dynamic XML reader (DXR) associated with an XML reader application (XRA) object, as described above. For example, the first user interface may be used to configure a DXR associated with the reader object 130 of FIG. 1. An XRA object is used to instantiate code that is particular to the information that the user requested. For example, the reader object 130 is associated with the first request 126 received from the first user device 104 and the second request 128 received from the second user device 106 of FIG. 1. An administrator may use the first user interface of FIG. 3 to set up a set of generic rules that do not immediately result in transformation code. Rather, transformation code is generated in real time or near real time to execute a particular transformation associated with information requested by a user.

A DXR configuration interface 302 allows the administrator to configure an XML feed. DXR configuration information may include information associated with how to retrieve XML data from a particular data source and how to parse and prepare the information for dynamic content presentation. The DXR configuration interface 302 may be displayed in response to an administrator selecting a particular XRA object. For example, the administrator may select the reader object 130 of FIG. 1 for configuration using the DXR configuration interface 302 of FIG. 3.

An administrator may name a DXR using the DXR XRA variable name input 304. For example, the name may be associated with the particular data source. In the case of a news website, the name may be the name of the news website. The data location may be configured using a data location configuration input 306. For example, by selecting a data feed configuration button 308 associated with the data location configuration input 306, a data feed configuration interface 310 may be displayed. The data feed configuration interface 310 allows an administrator to provide information associated with a type 312 of data feed, to provide an address 314 of the data feed, to provide file transfer protocol (FTP) connection information 316 (in the event that data is retrieved via an FTP connection), and to test and view the data feed configuration using a test and view button 318 prior to saving the information (e.g., using an OK button 320).

The information associated with the type 312 of data feed may include whether the data is associated with an FTP data feed, a Hypertext Transfer Protocol (HTTP) data feed, or a flat file data feed. Thus, the data feed configuration interface 310 may be used by an administrator to provide data feed information for multiple types of data feeds. In the event that the data feed is an FTP data feed, the FTP connection information 316 may include whether the FTP connection is an anonymous connection or whether the FTP connection requires a username and password. By selecting the test and view button 318, a web browser may be displayed to show the data retrieved via the data feed in order to allow an administrator to determine whether the proper data has been retrieved. After the data feed configuration information has been verified, the administrator may select the OK button 320 to save the information.

The DXR configuration interface 302 also includes an XSLT transformation input 322. In one embodiment, by selecting an XSLT transformation button 324 associated with the XSLT transformation input 322, a local file browser (not shown) may be displayed. The local file browser may be used by an administrator to select a predetermined XSLT transformation. For example, the predetermined XSLT transformation may be a generic transformation that is performed such that one or more transformations are performed prior to information being displayed to a customer. For example, the local file browser may display a list of plug-ins that includes a first plug-in to process strings for derogatory terms, a second plug-in to process strings for profanity, and a third plug-in to verify media locations. It should be noted that other predetermined XSLT transformations may be displayed via the local browser.

The DXR configuration interface 302 also includes a data request type input 326. In one embodiment, by selecting a data request type selection button 328 associated with the data request type input 326, an administrator may define whether the data feed request includes a post, get, or SOAP request, among other alternatives. In the case of an HTTP location, the post/get method may be used to retrieve the data (e.g., an HTTP URL request). When the location is an XML SOAP API, an XML message may be constructed to send to the XML location (e.g., .net or php information). Many SOAP APIs utilize a SOAP message wrapper/envelope, and such information may be provided by an administrator via a SOAP message wrapper input 330. A cache results button 332 and a cache length input 334 may be used to indicate whether the results should be cached and a length of time that the results should be cached. For example, by selecting the cache results button 332 and by inputting a cache length of thirty minutes in the cache length input 334, a subsequent request for the information from the data feed within thirty minutes may be retrieved from cache rather than retrieving the information from the XML source and performing transformation operations. To illustrate, in FIG. 1, the requested data 132 may be retrieved from the data source 122 in response to the first request 126 from the first user device 104. If the second request 128 from the second user device 106 is received within thirty minutes, the requested data 132 may be retrieved from cache rather than from the data source 122.

The DXR configuration interface 302 also includes an API configuration input 336. For a particular data feed, the API configuration input 336 may be used to populate different parameters associated with the particular data feed (e.g., a category, an identifier, a number of records to return). In one embodiment, an add API parameter button 338 may be used to add an API parameter, and a remove API parameter button 340 may be used to remove an API parameter. In one embodiment, an API parameter configuration interface (not shown) may be displayed in response to selection of the add API parameter button 338. The API parameter configuration interface allows the administrator to provide a parameter name and parameter wrapper information. Further, the API parameter configuration interface allows the administrator to select output parameters associated with values from previous requests.

The DXR configuration interface 302 also includes an XDP configuration interface 342. The XDP configuration interface 342 allows an administrator to set up variable names for a particular XDP. In response to selection of an add XDP button 344, an administrator may provide information associated with the particular XDP to be added via the XDP configuration interface 342. The information may include an XDP XRA variable name 344 and an XPath or an XQuery 346 associated with the XDP XRA variable name 344. The administrator may also indicate whether multiple items are expected via the multiple items expected input 348. When multiple items are expected, the particular XDP may be used as a binder to menu items. When a media resource input 350 is selected, the link is a location to a remote resource. A cache time selection input 352 may be used to select a predetermined cache time from a list of cache times. If the cache time is more than zero, the remote media resource is stored at a cache and all requests for the resource within the cache time window are directed to the stored location. If the cache time is zero, all requests for the media resource are directed to a remote location. The cached media resource names may be stored in a unique structure as defined in the remote media location, such that the file is unique and will not be overwritten if the same filename is used in multiple feeds. By selecting a test and view button 354, an administrator may determine whether the particular XDP has been properly configured. After the XDP configuration information has been verified, the administrator may select an OK button 356 to save the XDP configuration information. Once the XDP configuration information is saved, the particular XDP is displayed in a list of XDPs 358 at the DXR configuration interface 302. By selecting a remove XDP button 360, an XDP may be removed from the list of XDPs 358.

The DXR configuration interface 302 also includes a test and view button 362 and an OK button 364. In the event that an API is being tested, an Invoke API interface (not shown) may be displayed in response to a selection of the test and view button 362. The Invoke API interface allows the administrator to test and accept parameter values associated with the API. In the event that XML is being tested, a web browser (not shown) may be displayed in response to a selection of the test and view button 362. The web browser allows the administrator to show XML data from a data feed or a local file retrieved via an FTP download for verification purposes. In response to selection of the OK button 364, the DXR configuration is complete and the DXR configuration interface 302 may be closed to allow the administrator to add another DXR, or another DXR XRA variable name may be input via the DXR XRA variable name input 304.

Figure 4:
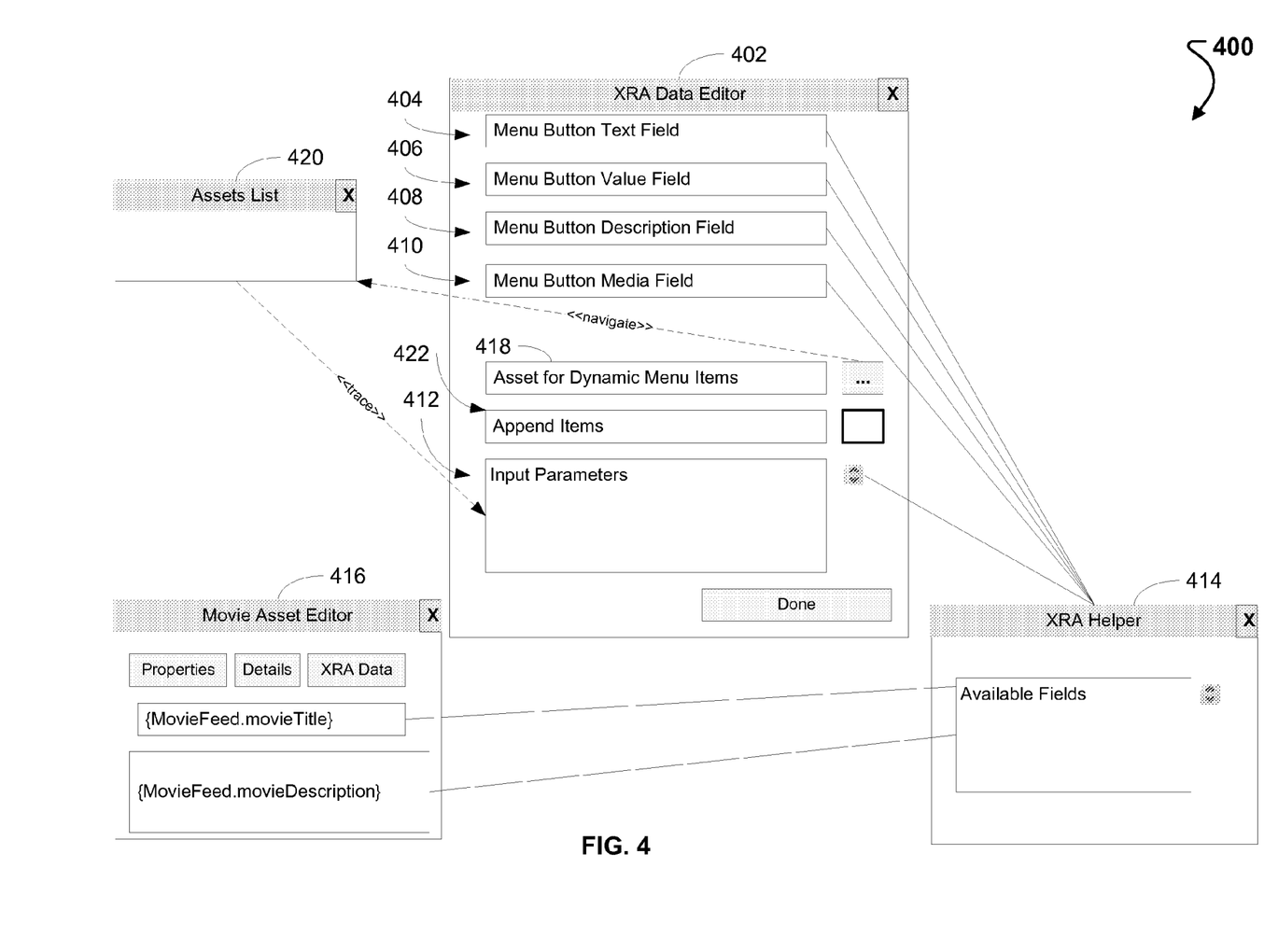
FIG. 4 is a general diagram of an illustrative embodiment of a second user interface associated with configuration of a dynamic content presentation system.

Referring to FIG. 4, a general diagram of an illustrative embodiment of a second user interface associated with configuration of a dynamic content presentation system is illustrated, at 400. The second user interface may be used by an administrator to configure the presentation of information gathered from a data feed (e.g., information gathered based on DXR XRA information provided via the DXR configuration interface 302 of FIG. 3). For example, the first presentation object 134 or the second presentation object 136 of FIG. 1 may be configured via the second interface of FIG. 4.

An XRA data editor interface 402 may be used to build an asset (e.g., a movie asset in the context of an IPTV application) via a drag and drop operation. Dynamic menu items are set from XRA variables that are indicated as having multiple possible items in the results. An XRA variable with multiple possible results is used to populate multiple fields. For example, in the embodiment illustrated in FIG. 4, the XRA variable with multiple possible results is used to populate a menu button text field 404, a menu button value field 406, a menu button description field 408, and a menu button media field 410. In response to selection of one of the dynamic menu items, an XRA helper window 414 is displayed. The XRA helper window 414 includes a tree view of all of the fields that are available to be used based on configured XRAs. An example of a type of asset is a movie asset. A movie asset editor 416 may be used to edit the movie asset based on the available fields displayed in the XRA helper window 414.

The XRA data editor interface 402 also includes an asset for dynamic menu items selector 418. In response to selection of the asset for dynamic menu items selector 418, an assets list 420 may be displayed that includes links to other assets using other XRA objects. The XRA data editor interface 402 also includes an append items input 422 allowing an administrator to append items and an input parameters box 412 to configure output parameters.

Figure 5:
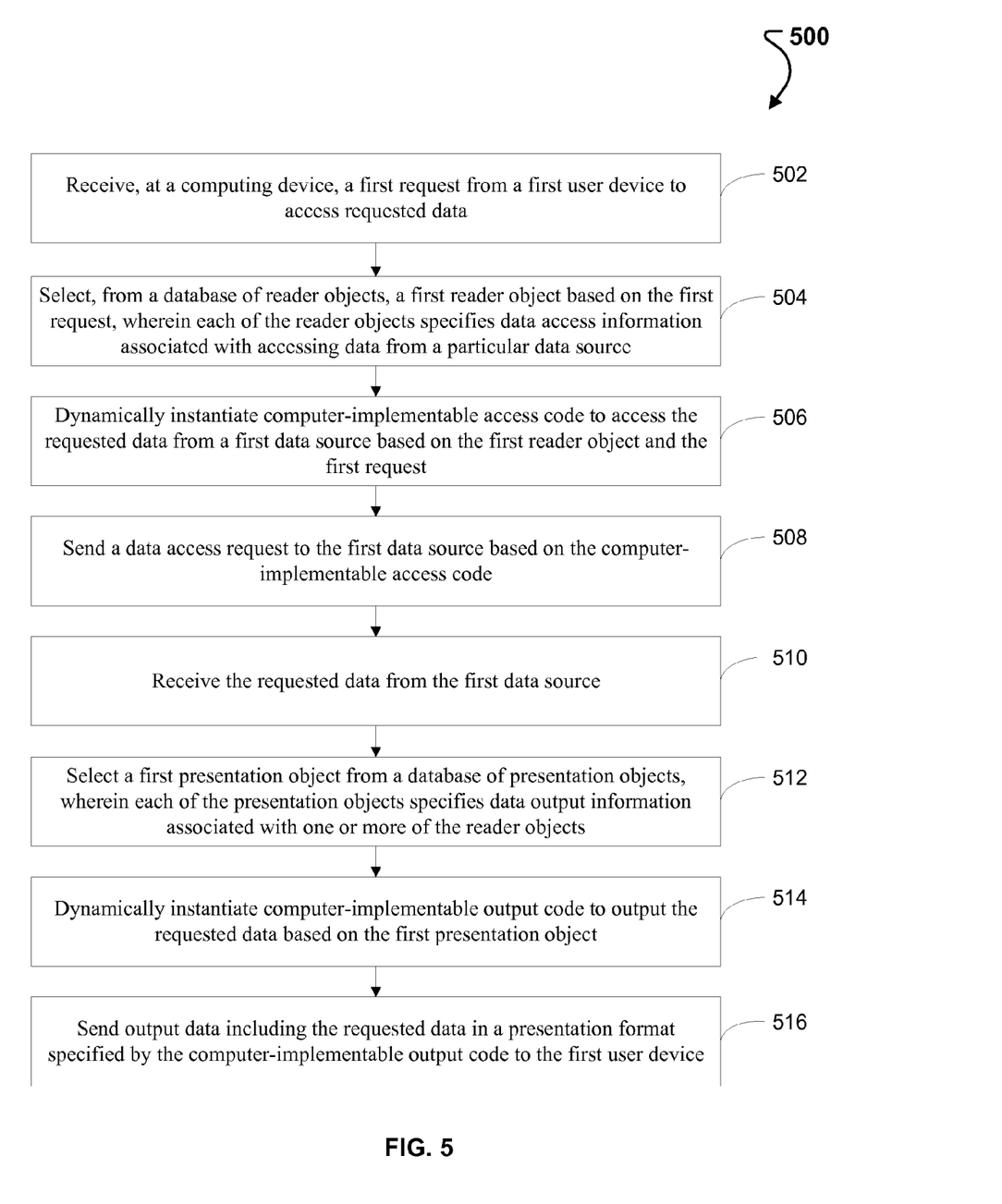
FIG. 5 is a flow chart of a particular illustrative embodiment of a method of dynamic content presentation.

Referring to FIG. 5, a particular illustrative embodiment of a computer-implemented method of dynamic content presentation is illustrated, at 500. The method 500 includes receiving, at a computing device, a first request from a first user device to access requested data, at 502. For example, the computing device 102 of FIG. 1 may receive the first request 126 from the first user device 104. As another example, the computing device 102 of FIG. 1 may receive the second request 128 from the second user device 106.

The method 500 also includes selecting, from a database of reader objects, a first reader object based on the first request, at 504. Each of the reader objects specifies data access information associated with accessing data from a particular data source. For example, the reader object selector 112 of FIG. 1 may select the reader object 130 from the database of reader objects 120. In FIG. 1, the reader object 130 specifies data access information associated with accessing data from the data source 122.

The method 500 includes dynamically instantiating computer-implementable access code to access the requested data from a first data source based on the first reader object and the first request, at 506. For example, in FIG. 1, the access code instantiator 114 dynamically instantiates computer-implementable access code to access the requested data 132 from the data source 122 based on the reader object 130 selected based on a request from a user device (e.g., the first request 126 from the first user device 104 or the second request 128 from the second user device 106).

The method 500 includes sending a data access request to the first data source based on the computer-implementable access code, at 508. For example, the computing device 102 sends the data access request 134 to the data source 122 based on the computer-implementable access code that is dynamically instantiated by the access code instantiator 114. The method 500 includes receiving the requested data from the first data source, at 510. For example, the computing device 102 of FIG. 1 receives the requested data 132 from the data source 122.

The method includes selecting a first presentation object from a database of presentation objects, at 512. Each of the presentation objects specifies data output information associated with one or more of the reader objects. For example, the presentation object selector 116 of FIG. 1 selects the first presentation object 134 from the database of presentation objects 124. The first presentation object 134 specifies data output information associated with the reader object 130. The first presentation object 134 may also specify data output information associated with other reader objects stored at the database of presentation objects 124.

The method 500 includes dynamically instantiating computer-implementable output code to output the requested data based on the first presentation object, at 514. For example, the output code instantiator 118 of FIG. 1 dynamically instantiates computer-implementable output code to output the requested data 132 based on the first presentation object 134. The method 500 also includes sending output data including the requested data in a presentation format specified by the computer-implementable output code to the first user device, at 516. For example, the output code instantiator 118 of FIG. 1 sends the first output data 138 to the first user device 104 in a presentation format specified by an administrator based on either the device type of the first user device 104 or the application type of the first application 108 or both. The first output data 138 includes the requested data 132 in the specified presentation format.

Figure 6:
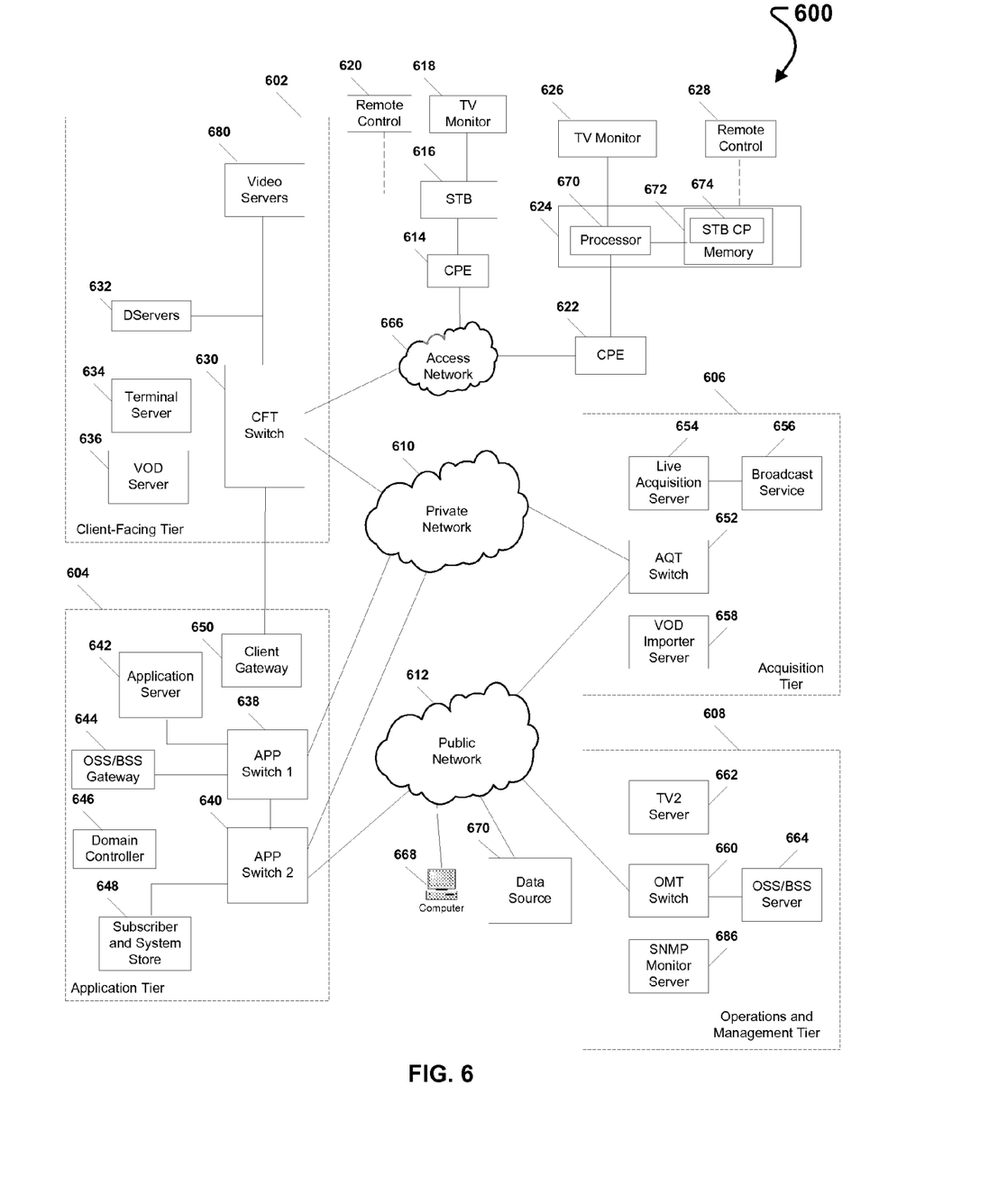
FIG. 6 is a block diagram of an illustrative embodiment of an Internet Protocol Television (IPTV) system to distribute multimedia content.

Referring to FIG. 6, an illustrative embodiment of an Internet Protocol Television (IPTV) system is illustrated and is generally designated 600. For example, the IPTV system 600 may be used to receive the first request 126 from the first user device 104 and to receive the second request 128 from the second user device 106 of FIG. 1, to send the data access request 134 to the data source 122 of FIG. 1, and to provide the first output data 138 to the first user device 104 and the second output data 140 to the second user device 106 of FIG. 1. As shown, the system 600 can include a client facing tier 602, an application tier 604, an acquisition tier 606, and an operations and management tier 608. Each tier 602, 604, 606, 608 is coupled to a private network 610; to a public network 612, such as the Internet; or to both the private network 610 and the public network 612. For example, the client-facing tier 602 can be coupled to the private network 610. Further, the application tier 604 can be coupled to the private network 610 and to the public network 612. The acquisition tier 606 can also be coupled to the private network 610 and to the public network 612. Additionally, the operations and management tier 608 can be coupled to the public network 612.

As illustrated in FIG. 6, the various tiers 602, 604, 606, 608 communicate with each other via the private network 610 and the public network 612. For instance, the client-facing tier 602 can communicate with the application tier 604 and the acquisition tier 606 via the private network 610. The application tier 604 can communicate with the acquisition tier 606 via the private network 610. Further, the application tier 604 can communicate with the acquisition tier 606 and the operations and management tier 608 via the public network 612. Moreover, the acquisition tier 606 can communicate with the operations and management tier 608 via the public network 612. In a particular embodiment, elements of the application tier 604, including, but not limited to, a client gateway 650, can communicate directly with the client-facing tier 602.

The client-facing tier 602 can communicate with user equipment via an access network 666, such as an Internet Protocol Television (IPTV) access network. For example, the user equipment may include the first user device 104 or the second user device 106 of FIG. 1. In an illustrative embodiment, customer premises equipment (CPE) 614, 622 can be coupled to a local switch, router, or other device of the access network 666. The client-facing tier 602 can communicate with a first representative set-top box device 616 at a first customer premises via the first CPE 614 and with a second representative set-top box device 624 at a second customer premises via the second CPE 622. The CPE 614, 622 can include routers, gateways, local area network devices, modems, such as digital subscriber line (DSL) modems, any other suitable devices for facilitating communication between a set-top box device and the access network 666, or any combination thereof.

In a particular embodiment, the client-facing tier 602 can be coupled to the CPE 614, 622 via fiber optic cables. Alternatively, the CPE 614, 622 can be digital subscriber line (DSL) modems that are coupled to one or more network nodes via twisted pairs, and the client-facing tier 602 can be coupled to the network nodes via fiber-optic cables. Each set-top box device 616, 624 can process data received via the access network 666, via an IPTV software platform.

The first set-top box device 616 can be coupled to a first external display device, such as a first television monitor 618, and the second set-top box device 624 can be coupled to a second external display device, such as a second television monitor 626. For example, the first user device 104 of FIG. 1 may be coupled to a first external display device, and the second user device 106 of FIG. 1 may be coupled to a second external display device. Moreover, the first set-top box device 616 can communicate with a first remote control 620, and the second set-top box device 624 can communicate with a second remote control 628. The set-top box devices 616, 624 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 616, 624 can receive data, video, or any combination thereof, from the client-facing tier 602 via the access network 666 and render or display the data, video, or any combination thereof, at the display device 618, 626 to which it is coupled. In an illustrative embodiment, the set-top box devices 616, 624 can include tuners that receive and decode television programming signals or packet streams for transmission to the display devices 618, 626. Further, the set-top box devices 616, 624 can include a STB processor 670 and a STB memory device 672 that is accessible to the STB processor 670. In one embodiment, a computer program, such as the STB computer program 674, can be embedded within the STB memory device 672. In another illustrative embodiment, a user computing device, such as a personal computer, laptop or local server, can be coupled to a set-top box device, such as the second representative set-top box device 624, for example, via a universal serial bus (USB) connection or other connection.

In an illustrative embodiment, the client-facing tier 602 can include a client-facing tier (CFT) switch 630 that manages communication between the client-facing tier 602 and the access network 666 and between the client-facing tier 602 and the private network 610. As illustrated, the CFT switch 630 is coupled to one or more data servers, such as D-servers 632, that store, format, encode, replicate, or otherwise manipulate or prepare video content for communication from the client-facing tier 602 to the set-top box devices 616, 624. The CFT switch 630 can also be coupled to a terminal server 634 that provides terminal devices with a connection point to the private network 610. In a particular embodiment, the CFT switch 630 can be coupled to a video-on-demand (VOD) server 636 that stores or provides VOD content imported by the IPTV system 600. Further, the CFT switch 630 is coupled to one or more video servers 680 that receive video content and transmit the content to the set-top boxes 616, 624 via the access network 666.

In an illustrative embodiment, the client-facing tier 602 can communicate with a large number of set-top boxes, such as the representative set-top boxes 616, 624 over a wide geographic area, such as a regional area, a metropolitan area, a viewing area, a designated market area or any other suitable geographic area, market area, or subscriber or customer group that can be supported by networking the client-facing tier 602 to numerous set-top box devices. In a particular embodiment, the CFT switch 630, or any portion thereof, can include a multicast router or switch that feeds one or more video streams from a video server to multiple set-top box devices.

As illustrated in FIG. 6, the application tier 604 can communicate with both the private network 610 and the public network 612. The application tier 604 can include a first application tier (APP) switch 638 and a second APP switch 640. In a particular embodiment, the first APP switch 638 can be coupled to the second APP switch 640. The first APP switch 638 can be coupled to an application server 642 and to an OSS/BSS gateway 644. In a particular embodiment, the application server 642 can provide applications to the set-top box devices 616, 624 via the access network 666, which enable the set-top box devices 616, 624 to provide functions, such as display, messaging, processing of IPTV data and VOD material, etc. In a particular embodiment, the application server 642 includes the computing device 102 of FIG. 1 and may provide applications to the first user device 104 and to the second user device 106 of FIG. 1.

The second APP switch 640 can be coupled to a domain controller 646 that provides Internet access, for example, to users at their computers 668 via the public network 612. For example, the domain controller 646 can provide remote Internet access to IPTV account information, e-mail, personalized Internet services, or other online services via the public network 612. Further, the second APP switch 640 may allow data to be retrieved from a data source 670 via the public network 612. For example, the data source 670 may be the data source 122 of FIG. 1 (e.g., an XML data feed), and the data may include the requested data 132 of FIG. 1 (e.g., XML data). In addition, the second APP switch 640 can be coupled to a subscriber and system store 648 that includes account information, such as account information that is associated with users who access the IPTV system 600 via the private network 610 or the public network 612. In an illustrative embodiment, the subscriber and system store 648 can store subscriber or customer data and create subscriber or customer profiles that are associated with IP addresses of corresponding set-top box devices 616, 624.

In a particular embodiment, the application tier 604 can include a client gateway 650 that communicates data directly to the client-facing tier 602. In this embodiment, the client gateway 650 can be coupled directly to the CFT switch 630. The client gateway 650 can provide user access to the private network 610 and the tiers coupled thereto. In an illustrative embodiment, the set-top box devices 616, 624 can access the IPTV system 600 via the access network 666, using information received from the client gateway 650. User devices can access the client gateway 650 via the access network 666, and the client gateway 650 can allow such devices to access the private network 610 once the devices are authenticated or verified.

As indicated in FIG. 6, the acquisition tier 606 includes an acquisition tier (AQT) switch 652 that communicates with the private network 610. The AQT switch 652 can also communicate with the operations and management tier 608 via the public network 612. In a particular embodiment, the AQT switch 652 can be coupled to a live acquisition server 654 that receives or acquires television content, movie content, advertisement content, other video content, or any combination thereof, from a broadcast service 656, such as a satellite acquisition system or satellite head-end office. In a particular embodiment, the live acquisition server 654 can transmit content to the AQT switch 652, and the AQT switch 652 can transmit the content to the CFT switch 630 via the private network 610.

In an illustrative embodiment, content can be transmitted to the D-servers 632, where it can be encoded, formatted, stored, replicated, or otherwise manipulated and prepared for communication from the video server(s) 680 to the set-top box devices 616, 624. The CFT switch 630 can receive content from the video server(s) 680 and communicate the content to the CPE 614, 622 via the access network 666. The set-top box devices 616, 624 can receive the content via the CPE 614, 622, and can transmit the content to the television monitors 618, 626. In an illustrative embodiment, video or audio portions of the content can be streamed to the set-top box devices 616, 624.

Further, the AQT switch 652 can be coupled to a video-on-demand importer server 658 that receives and stores television or movie content received at the acquisition tier 606 and communicates the stored content to the VOD server 636 at the client-facing tier 602 via the private network 610. Additionally, at the acquisition tier 606, the video-on-demand (VOD) importer server 658 can receive content from one or more VOD sources outside the IPTV system 600, such as movie studios and programmers of non-live content. The VOD importer server 658 can transmit the VOD content to the AQT switch 652, and the AQT switch 652, in turn, can communicate the material to the CFT switch 630 via the private network 610. The VOD content can be stored at one or more servers, such as the VOD server 636.

When users issue requests for VOD content via the set-top box devices 616, 624, the requests can be transmitted over the access network 666 to the VOD server 636, via the CFT switch 630. Upon receiving such requests, the VOD server 636 can retrieve the requested VOD content and transmit the content to the set-top box devices 616, 624 across the access network 666, via the CFT switch 630. The set-top box devices 616, 624 can transmit the VOD content to the television monitors 618, 626. In an illustrative embodiment, video or audio portions of VOD content can be streamed to the set-top box devices 616, 624.

FIG. 6 further illustrates that the operations and management tier 608 can include an operations and management tier (OMT) switch 660 that conducts communication between the operations and management tier 608 and the public network 612. In the embodiment illustrated by FIG. 6, the OMT switch 660 is coupled to a TV2 server 662. Additionally, the OMT switch 660 can be coupled to an OSS/BSS server 664 and to a simple network management protocol (SNMP) monitor 686 that monitors network devices within or coupled to the IPTV system 600. In a particular embodiment, the OMT switch 660 can communicate with the AQT switch 652 via the public network 612.

Figure 7:
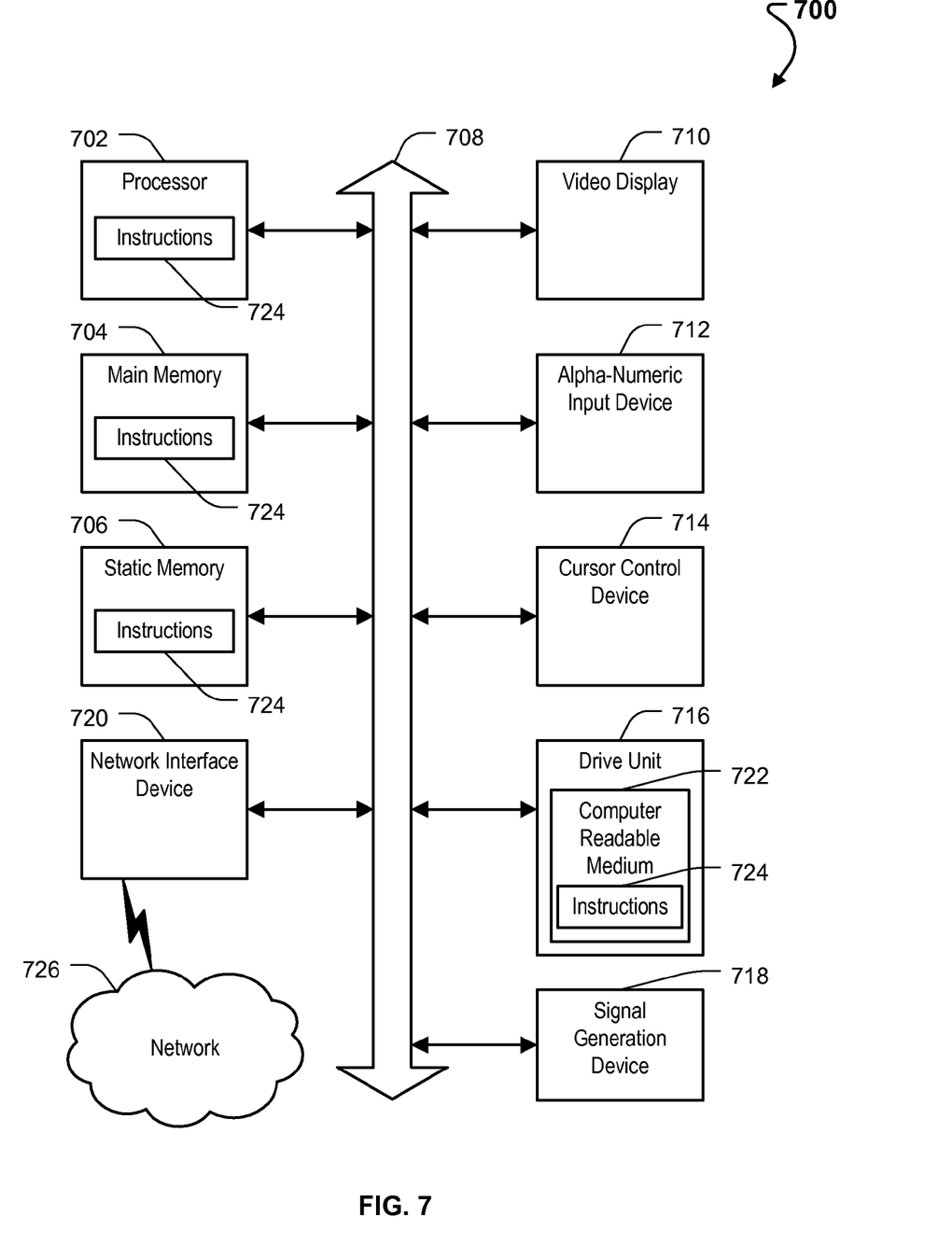
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700, or any portion thereof, may operate as a standalone device or may be connected, e.g., using a network, to other computer systems or peripheral devices.

In a networked deployment, the computer system 700 may operate in the capacity of a set-top box device, a server, or a mobile computing device. For example, the computer system may include the first user device 104 of FIG. 1, the second user device 106 of FIG. 1, the computing device 102 of FIG. 1, the database of reader objects 120 of FIG. 1, and the database of presentation objects 124 of FIG. 1.

The computer system 700 can also be implemented as or incorporated into various devices, such as a personal computer (PC), a tablet PC, a personal digital assistant (PDA), a mobile device, a palmtop computer, a laptop computer, a desktop computer, a communications device, a web appliance, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics-processing unit (GPU), or both. Moreover, the computer system 700 can include a main memory 704 and a static memory 706 that can communicate with each other via a bus 708. As shown, the computer system 700 may further include or be coupled to a video display unit 710, such as a liquid crystal display (LCD), an organic light emitting diode (OLED), a flat panel display, a solid-state display, or a projection display. Additionally, the computer system 700 may include an input device 712, such as a keyboard, a remote control device, and a cursor control device 714, such as a mouse. The computer system 700 can also include a disk drive unit 716, a signal generation device 718, such as a speaker or remote control device, and a network interface device 720. The network interface device 720 may be coupled to other devices (not shown) via a network 726.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/item distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable storage medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the invention is not limited to such standards and protocols. For example, standards for Internet (e.g., XML data formats, such as RSS, XHTML, and SOAP), other packet switched network transmission (e.g., TCP/IP, UDP/IP, HTML, and HTTP) and standards for viewing media content (e.g. MPEG, SMPTE, and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method comprising:
   receiving, at a computing device via a network, a first request from a first user device for first data, wherein the first request identifies a device type of the first user device and identifies a first data source associated with the first data;
   selecting a first reader object from a first database that includes a plurality of reader objects, wherein the first reader object is selected based on the first data source;
   instantiating, at runtime, first access code based on the first reader object;
   executing the first access code to generate a first data access request, the first data access request formatted for the first data source based on the first reader object;
   sending the first data access request to the first data source;
   receiving, at the computing device, received data from the first data source, wherein the received data has a first format;
   transforming the received data in the first format to normalized data in a normalized format based on the first reader object;
   selecting, at the computing device, a particular presentation object from a second database based on the device type of the first user device, wherein the second database includes a plurality of presentation objects;
   instantiating, at runtime at the computing device, output code based on the particular presentation object;
   executing the output code, at the computing device, to transform the normalized data in the normalized format to output data in an output format based on the particular presentation object; and
   sending the output data in the output format to the first user device.

2. The computer-implemented method of claim 1, further comprising:
   after receiving the received data, selecting a second reader object from the plurality of reader objects, wherein the second reader object is selected based on a reference included in the received data;
   instantiating, at runtime, second access code based on the second reader object;
   executing the second access code to generate a second data access request, the second data access request formatted for a second data source associated with the reference; and
   sending the second data access request to the second data source wherein the second data source is not identified by the first request.

3. The computer-implemented method of claim 2, wherein the second reader object is selected in response to detecting an event associated with the received data.

4. The computer-implemented method of claim 1, wherein transforming the received data in the first format to the normalized data in the normalized format comprises truncating a portion of the received data, filtering the received data, verifying the first portion of the received data, sorting the received data, or any combination thereof.

5. The computer-implemented method of claim 1, further comprising:
   storing a portion of the received data at a data cache;
   receiving, at the computing device, a second request, the second request associated with providing second data to a second user device, wherein the second data includes the portion of the received data; and
   outputting the second data to the second user device from the data cache.

6. The computer-implemented method of claim 1, wherein each presentation object of the plurality of presentation objects specifies a data presentation format associated with a particular device type.

7. The computer-implemented method of claim 1, wherein instantiating the output code includes:
   processing an extensible markup language data pointer to generate processed data, wherein the particular presentation object is associated with the extensible markup language data pointer; and
   mapping the processed data to output fields associated with a particular application being executed at the first user device.

8. The computer-implemented method of claim 1, wherein the first user device is a set-top box device, a mobile device, or a second computing device, and wherein the first user device is distinct from the computing device.

9. The computer-implemented method of claim 1, further comprising:
   storing the received data in a data cache for a first length of time associated with the first reader object; and
   storing second data in the data cache for a second length of time associated with a second reader object.

10. The computer-implemented method of claim 1, wherein transforming the received data to normalized data includes filtering the received data to remove offensive content.

11. The computer-implemented method of claim 1, wherein transforming the received data to normalized data includes truncating a particular data field of the received data.

12. The computer-implemented method of claim 1, wherein transforming the normalized data to output data includes mapping data fields of the normalized format to corresponding data fields in the output format.

13. The computer-implemented method of claim 1, further comprising caching the output data based on the reader object.

14. A system comprising:
a processor;
a reader object selector executable by the processor to select a particular reader object from a first database that includes a plurality of reader objects, wherein the particular reader object is selected based on a data source identified in a request received from a user device, wherein the request indicates a device type of the user device;
an access code instantiator executable by the processor to instantiate access code based on the particular reader object, wherein the access code, upon execution by the processor, causes the processor to send a data access request to the data source;
a generic object executable by the processor to transform data received in a first format from the data source in response to the data access request to normalized data in a normalized format based on the particular reader object;
a presentation object selector executable by the processor to select a particular presentation object from a second database based on the device type of the user device; and
an output code instantiator executable by the processor to instantiate output code, wherein the output code, upon execution by the processor, causes the processor to transform the normalized data in the normalized format to output data in an output format based on the particular presentation object, and to send the output data to the user device.

15. The system of claim 14, wherein the particular reader object includes information associated with a process of accessing and retrieving data from the data source.

16. The system of claim 14, wherein transforming the data received in the first format to the normalized data in the normalized format includes filtering the data to remove offensive content, truncating a particular data field of the data, or both.

17. A computer-readable storage device comprising instructions that, when executed by a processor, cause the processor to perform operations including:

receiving, via a network, a request from a user device for data, wherein the request identifies a device type of the user device and identifies a data source associated with the data;
selecting a reader object from a first database that includes a plurality of reader objects, wherein the reader object is selected based on the data source;
instantiating, at runtime, access code based on the reader object;
executing the access code to generate a data access request, the data access request formatted for the data source based on the reader object;
sending the data access request to the data source;
receiving received data from the data source, wherein the received data has a first format;
transforming the received data in the first format to normalized data in a normalized format based on the reader object;
selecting a particular presentation object from a second database based on the device type of the user device, wherein the second database includes a plurality of presentation objects;
instantiating, at runtime, output code based on the particular presentation object;
executing the output code, at the computing device, to transform the normalized data in the normalized format to output data in an output format based on the particular presentation object; and
sending the output data in the output format to the user device.

18. The computer-readable storage device of claim 17, wherein the reader object includes information associated with retrieving extensible markup language data from the data source, and wherein the extensible markup language data includes really simple syndication data, extensible hypertext markup language data, simple object access protocol data, or a combination thereof.

19. The computer-readable storage device of claim 17, wherein the reader object includes information associated with retrieving data from one of a file transfer protocol data source, a hypertext markup language data source, or a flat file data source.

20. The computer-readable storage device of claim 17, wherein the operations further include:
storing the received data in a data cache for a first length of time indicated by the reader object; and
storing second data associated with a second reader object in the data cache for a second length of time indicated by the second reader object.

* * * * *